Feb. 4, 1936.                J. W. VAN DENBURG                    2,029,348
                                HEADLIGHT SYSTEM
                               Filed May 16, 1934
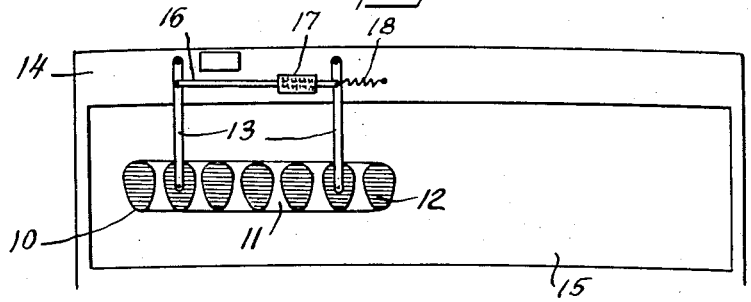
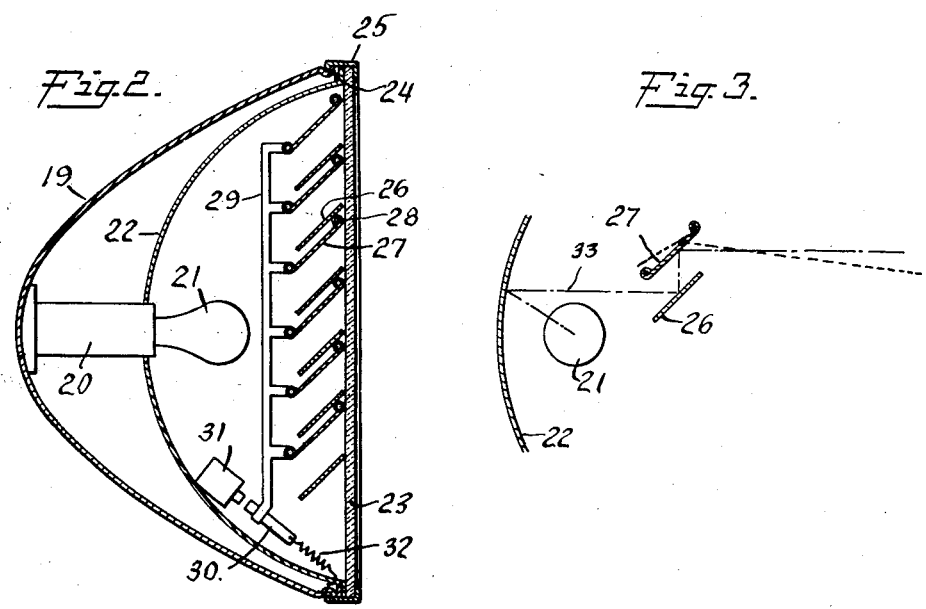
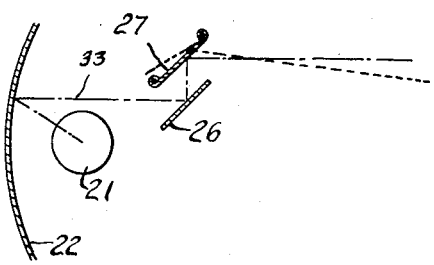
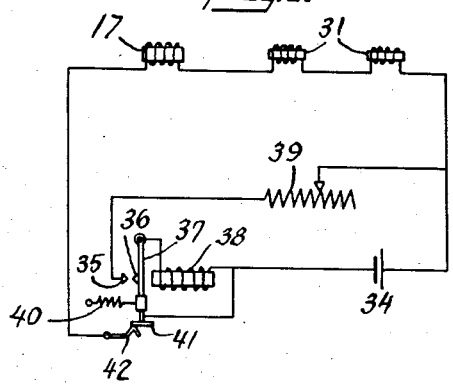
INVENTOR
John W. Van Denburg
BY
Pennie Davis, Marvin & Edmonds
ATTORNEYS Patented Feb. 4, 1936

2,029,348

UNITED STATES PATENT OFFICE 2,029,348

HEADLIGHT SYSTEM

John W. Van Denburg, White Plains, N. Y.

Application May 16, 1934, Serial No. 725,855

7 Claims. (Cl. 240—45)

This invention relates to lighting systems for use on vehicles, such as motor cars, locomotives, and the like, and is concerned more particularly with a novel lighting system which provides the desired illumination of the road over which the vehicle is traveling and at the same time protects the driver of the vehicle from the glare from the headlights of approaching vehicles.

The system of the invention may be employed on vehicles of different types but offers particular advantages when used on motor cars. An embodiment of the invention suitable for motor car use will accordingly be described in detail, for purposes of explanation, but it is to be understood that the utility of the invention is not restricted to that particular application.

At the present time, motor cars are commonly provided with headlights of great power, capable of throwing beams for a long distance, and to prevent the beams from dazzling and blinding the drivers of approaching vehicles, the lamps are equipped with diffusing lenses, the use of which is mandatory under the laws of most States. While these lenses reduce the glare to some extent, they are not entirely satisfactory, and many drivers equip their cars with opaque or colored shields as a protection from glare. Such shields or screens either obscure or dim the vision of the driver using them and are, therefore, objectionable.

The present invention is accordingly directed to the provision of a lighting system which overcomes these difficulties, and the new system not only provides the driver of the vehicle on which it is used with the necessary illumination of his path but also protects him from the glare of headlights on approaching cars by intercepting a large proportion of the light therefrom.

The new system comprises one or more sources of light on the car, such as a spotlight or a pair of headlights, and these light sources are operated to illuminate portions of the area in front of the car intermittently. For this purpose, the beam from each source is oscillated in a plane, either horizontal or vertical, and when a pair of headlights are employed, the beams swing in unison. In front of the driver and in his path of vision is mounted a screen which is movable in the same plane as the beam so that as the driver looks directly through it, it successively obscures and reveals parts of the roadway. Preferably, in a motor car installation, the beam is oscillated in a substantially horizontal plane so that the edges of the road are intermittently illuminated, and the screen consists of transparent and non-transparent areas arranged in alteration and is oscillated in a substantially horizontal plane in synchronism with the beam.

The driver observes the roadway through the two transparent areas which lie directly in front of his eyes at any time and those parts of the roadway observable through these areas are constantly illuminated. The moving screen before his eyes, however, serves to intercept a large proportion of the light coming from the headlights of approaching vehicles, and the driver is thus protected from glare and at the same time provided with proper illumination in front of his own car.

The new system may be varied in operation according to the particular requirements of the user, as for example, the amplitude of oscillation of the beam and screen may be narrow or wide and the frequency of oscillation may be varied. The frequency must in all instances be at least high enough to correspond with the persistence of vision of the user, but by varying the frequency, oscillation of the screen in phase with an oscillating beam on an approaching car can be avoided, thus insuring the user of proper protection at all times. Also, the brightness of the lights on approaching cars can be dimmed by varying the ratio of the size of the transparent areas on the screen to that of the non-transparent areas.

For a better understanding of the invention, reference may be had to the accompanying drawing, in which:

Fig. 1 is a front view of one form of screen used in the new system;

Fig. 2 is a horizontal sectional view through one form of headlight used in the new system;

Fig. 3 is a diagrammatic view showing the path of a light ray from the light source in the headlight shown in Fig. 2; and Fig. 4 is a diagrammatic view of an electric circuit which may be used in operating the new system.

The system illustrated comprises a screen 10 which includes a plurality of transparent areas 11 alternating with non-transparent areas 12. The screen may be made of various materials, such, for example, as a strip of transparent celluloid with dark patches of similar material cemented to it, or it may be made of glass or clear "Bakelite" with areas thereof darkened in any suitable way, or of light wire or pressed metal provided with dark patches of silk. In the form shown, the screen is long and narrow and it is mounted on arms 13 pivoted on a suitable part of the vehicle, such as the cross-bar 14 over the windshield 15, the screen thus lying to the rear of the windshield and in the path of vision of the driver. The screen is oscillated laterally in any suitable way as, for example, by means of a rod 16 connecting the arms 13 and acted on by an electromagnet 17 mounted on the cross-bar 14, the magnet swinging the screen in one direction and a spring 18 attached to one of the arms 13 and to the cross-bar 14 moving the screen in the opposite direction.

The headlights or spotlight used in connection with the screen are of the form illustrated in Figure 2 and comprise the shell 19 which contains a socket 20 for an electric bulb 21 and the usual reflector 22 of generally parabolic form.

The front opening of the shell is provided with a lens 23, and the lens and the rim of the reflector are held in place against the rim of the shell by any suitable means, such as the clamping ring 25. The lens employed is, in general, such as to produce an illuminated field corresponding with the shape of the area ahead of the car which is visible through the transparent areas of the screen. While almost any desired shape of beam is feasible, the beam employed with the apparatus described is preferably substantially narrower than the usual headlight beam.

In order to produce oscillation of the beam, various devices may be employed, as for example, the parabolic reflector may be mounted for swinging movement and swung by suitable means. Another advantageous construction is that illustrated, which is used to produce a beam oscillating horizontally, and includes a series of fixed reflector vanes 26, mounted vertically within the headlight behind the lens 23 and lying in the path of the beam projected by the reflector 22 and at an angle thereto. The fixed vanes 26 may be mounted in position in any suitable way, as for example, on a ring frame within the headlight. Arranged in alternation with the fixed reflector elements are movable reflector vanes 27, mounted on vertical pivots 28 in any suitable support such as the ring frame mentioned.

In the operation of the apparatus, the movable vanes are oscillated on the pivots in unison and for the purpose, the free edges of the vanes may be connected together by a rod 29 which may be reciprocated in any suitable way as by means of an electric motor. Instead of being driven by a motor, the rod may be connected to the armature 30 of an electromagnet 31, a spring 32 being connected to the armature 30 or to the rod to move the vanes in the direction opposite to that in which they are moved by the electromagnet.

The fixed and movable vanes cooperate to swing the beam in a plane, and the action of the vanes in the construction illustrated is shown in Figure 3, in which the path of a ray from the light source is designated 33. When the movable vane 27 is in the central position shown in full lines, a ray 33, passing from the reflector 22, strikes the surface of the fixed vane 26, and then passes to the front face of vane 27 and is projected out of the headlight. When the vane 27 is at either end of its travel, as for example, in the position shown in dotted lines, the ray is reflected by the vane to one side or the other, depending upon the position of the vane. The effect of swinging the movable vanes, therefore, is to cause the beam from the headlight to oscillate horizontally through a path determined by the amplitude of swinging movement of the movable vanes.

In order that the screen and the movable vanes 27 of the headlights may oscillate in synchronism, the operating means for the screen and vanes are connected in a single circuit, such as that illustrated in Figure 4. This circuit includes a source of energy 34 in which the solenoid of the electromagnet 17 and the solenoids of the electromagnets 31 employed in the two headlights are connected in series. The current flowing through this circuit is periodically interrupted by an interrupter of suitable form which may include a fixed contact 35 and a movable contact 36 mounted on an arm 37. The arm 37 is acted on by electromagnet 38 which lies in a shunt circuit across the battery terminals, which includes a variable resistance 39, the pull of the solenoid 38 being resisted by a spring 40. The arm 37 carries a contact member 41 on its free end which cooperates with a brush 42, the member 41 being insulated from the contact member 36 on the arm and the members 41 and 42 being connected in the main circuit through the electromagnets 17 and 31.

With the circuit described, the spring 40 tends to keep the contacts 35 and 36 together and while the spring is acting, contact members 41 and 42 complete the circuit through the electromagnets 17 and 31. When contacts 35 and 36 close the shunt circuit, the electromagnet 38 is energized and pulls the arm 37 toward it, and the movement of the arm separates contacts 35 and 36 and also contacts 41 and 42, breaking the circuit through the electromagnets 17 and 31. As soon as the contacts 35 and 36 are separated, electromagnet 38 becomes de-energized and the spring 40 moves the arm 37 back to bring contacts 35 and 36 together, whereupon the cycle of operations is repeated.

In the construction described, I have referred to the use of electromagnets for operating the screen and beams. It is to be understood, however, that other driving means may be employed, such as electric motors. Preferably, the movement of the screen and beams is substantially uniform, so that a substantially uniformly lighted field is obtained, and for this result, the screen and beams should move at a fairly steady speed in one direction and then reverse direction and come back rapidly to the desired speed in the other direction. This effect is obtained best, when an electromagnet and spring combination is employed, by placing resilient buffers at the ends of the path of travel of the vanes and screen, these buffers helping to bring the parts rapidly to rest and to bring them quickly up to speed in the reverse direction.

With the lighting system described, the driver of the vehicle sees the road ahead of him through the two central transparent areas on the screen and since the beams and screen oscillate in synchronism, the roadway appears to be constantly illuminated by a stationary beam. At the same time, the movement of the screen in front of his eyes protects him effectively from the glare of approaching headlights. To an observer on an approaching vehicle, the oscillating beams appear substantially as of the intensity of diffused steady beams so that he is caused no discomfort by reason of the oscillation. The system thus affords proper illumination of the roadway for the driver of the vehicle on which it is used and he is not dependent for protection from glare on the use on approaching vehicles of diffusing lenses and the like.

While the new lighting system has been disclosed in a form which is satisfactory for practical use, it will be apparent that various changes may be made in the structure disclosed without departing from the principles of the invention. For example, the screen may be mounted outside the windshield or mounted on arms pivoted at the bottom of the windshield, and these arms may be arranged to fold so that the screen may be removed from the path of vision of the driver for daylight driving. Likewise, the fixed reflector vanes in the headlights may be mounted for adjustment so that they may be placed parallel to the rays issuing from the headlight whenever it is desired not to make use of the system. With the vanes so disposed, the headlights function in the ordinary manner.

I claim:

1. A lighting system for use on vehicles which comprises a source of light on the vehicle, reflector means for directing light rays from said source to form a relatively narrow beam and swinging said beam back and forth, a screen disposed across the path of vision of an observer of objects illuminated by said beam, said screen including transparent and non-transparent areas arranged alternately in a row, and means oscillating said screen lengthwise of said row in synchronism with said beam.

2. A lighting system for use on vehicles which comprises a source of light on the vehicle, reflector means including a movable reflector element and a fixed reflector element cooperating to direct light rays from said source to form a relatively narrow beam and to oscillate said beam, a screen disposed across the path of vision of an observer of objects illuminated by said beam, said screen including transparent and non-transparent areas arranged alternately in a row, and means for oscillating said screen lengthwise of said row in synchronism with said beam.

3. A lighting system for use on vehicles which comprises a source of light on the vehicle, reflector means for directing light rays from said source to form a relatively narrow beam, said means including a movable reflector element disposed in the light path from said source, a movable screen disposed across the path of vision of an observer of objects illuminated by said beam, said screen including transparent and non-transparent areas arranged alternately in a row, and means for moving said movable reflector element to cause said beam to oscillate and for moving said screen in a direction lengthwise of said row to provide a path of vision oscillating in unison with said beam.

4. A lighting system for use on vehicles which comprises a source of light on the vehicle, reflector means for directing light rays from said source to form a relatively narrow beam, including a plurality of movable and fixed reflector elements arranged in alternation and means for rocking said movable elements to cause said beam to oscillate in a substantially horizontal plane, a movable screen disposed across the path of vision of an observer of objects illuminated by said beam, said screen including transparent and non-transparent areas arranged alternately in a row, and means for moving said screen in a direction lengthwise of said row in synchronism with said movable reflectors.

5. A lighting system for use on vehicles which comprises a source of light on the vehicle, reflector means for directing light rays from said source to form a relatively narrow laterally oscillating beam, said means including a plurality of movable and stationary reflectors arranged in alternation, a movable screen disposed across the path of vision of an observer of objects illuminated by said beam and including transparent and non-transparent areas arranged alternately in a row, and electrical means for moving said screen and said movable reflectors in synchronism, said screen being moved lengthwise of said row.

6. A lighting system for use on vehicles which comprises a headlight containing a source of light, a reflector in the headlight directing the rays to form a relatively narrow beam, a plurality of stationary reflector vanes in the path of the beam, a plurality of movable reflector vanes in the path of the beam and arranged in alternation with the stationary vanes, and means for moving said movable vanes to cause them to direct the beam back and forth laterally, and a screen in the path of vision of an observer of objects illuminated by said beam and comprising transparent and non-transparent areas in alternation in a substantially horizontal series, and means for moving said screen back and forth in a generally horizontal direction in synchronism with said beam.

7. A light system for use on vehicles which comprises a headlight containing a source of light, a reflector in the headlight directing the rays to form a relatively narrow beam, a plurality of stationary reflector vanes in the path of the beam, a plurality of movable reflector vanes in the path of the beam and arranged in alternation with the stationary vanes, and means for moving said movable elements to cause them to direct the beam back and forth laterally, and a screen in the path of vision of an observer of objects illuminated by said beam and comprising transparent and non-transparent areas arranged alternately in a substantially horizontal row, means for moving said screen back and forth lengthwise of said row in synchronism with said beam, and means for varying the speed of movement of said screen and said beam, respectively.

JOHN W. VAN DENBURG.